United States Patent
Sakyo et al.

(10) Patent No.: US 6,206,457 B1
(45) Date of Patent: Mar. 27, 2001

(54) OPERATOR'S CAB FOR CONSTRUCTION MACHINES

(75) Inventors: Tsuyoshi Sakyo, Ibaraki; Toichi Hirata, Ushiku; Kazuhisa Tamura, Ishioka; Jun Sonoda, Abiko, all of (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 09/355,778
(22) PCT Filed: Dec. 2, 1998
(86) PCT No.: PCT/JP98/05434
§ 371 Date: Aug. 3, 1999
§ 102(e) Date: Aug. 3, 1999
(87) PCT Pub. No.: WO99/28178
PCT Pub. Date: Jun. 10, 1999

(30) Foreign Application Priority Data

Dec. 4, 1997 (JP) .................................................. 9-334464

(51) Int. Cl.[7] .................................................. B60J 7/00
(52) U.S. Cl. .................................. 296/190.08; 296/204
(58) Field of Search .................. 296/190.08, 190.01, 296/183, 203.04, 204, 30

(56) References Cited

U.S. PATENT DOCUMENTS

| | | | |
|---|---|---|---|
| 3,423,122 | * 1/1969 | Wessells | 296/204 |
| 3,568,418 | * 3/1971 | Copley et al. | 296/190.08 |
| 4,094,545 | * 6/1978 | Kramer | 296/190.08 |
| 4,221,274 | * 9/1980 | Martin | 296/190.08 |
| 4,506,756 | * 3/1985 | Bergous | 296/204 |
| 4,650,242 | * 3/1987 | Ode et al. | 296/190.08 |
| 4,772,064 | * 9/1988 | Moore | 296/190.08 |
| 4,772,065 | * 9/1988 | Nakata et al. | 296/190.08 |
| 4,941,702 | * 7/1990 | Southward | 296/190.08 |
| 5,273,340 | * 12/1993 | Nelson et al. | 296/190.08 |
| 5,704,644 | * 1/1998 | Jaggi | 296/204 |
| 5,769,486 | * 6/1998 | Novoa et al. | 296/190.08 |

FOREIGN PATENT DOCUMENTS

| | | |
|---|---|---|
| 60-179372 | 9/1985 | (JP) . |
| 63-2675 | 1/1988 | (JP) . |
| 9-25648 | 1/1997 | (JP) . |

* cited by examiner

Primary Examiner—Joseph D. Pape
Assistant Examiner—Kiran B. Patel
(74) Attorney, Agent, or Firm—Oliff & Berridge, PLC (57) ABSTRACT

An operator's cab in a construction machine, which has pillars standing at a left side surface and a right side surface, includes a frame reinforcement member that extends between the pillars and meets at a near right angle to the pillars so as to create a resistance against a bending load applied to the pillars.

11 Claims, 15 Drawing Sheets

PRIOR ART

PRIOR ART

PRIOR ART

OPERATOR'S CAB FOR CONSTRUCTION MACHINES

INCORPORATION BY REFERENCE

The disclosures of the following priority application is herein incorporated by reference:

Japanese Patent Application No. Heisei-9-334464, filed Dec. 4, 1997.

TECHNICAL FIELD

The present invention relates to an operator's cab (or room) in a construction machine such as a hydraulic shovel.

BACKGROUND ART

Figure 13:
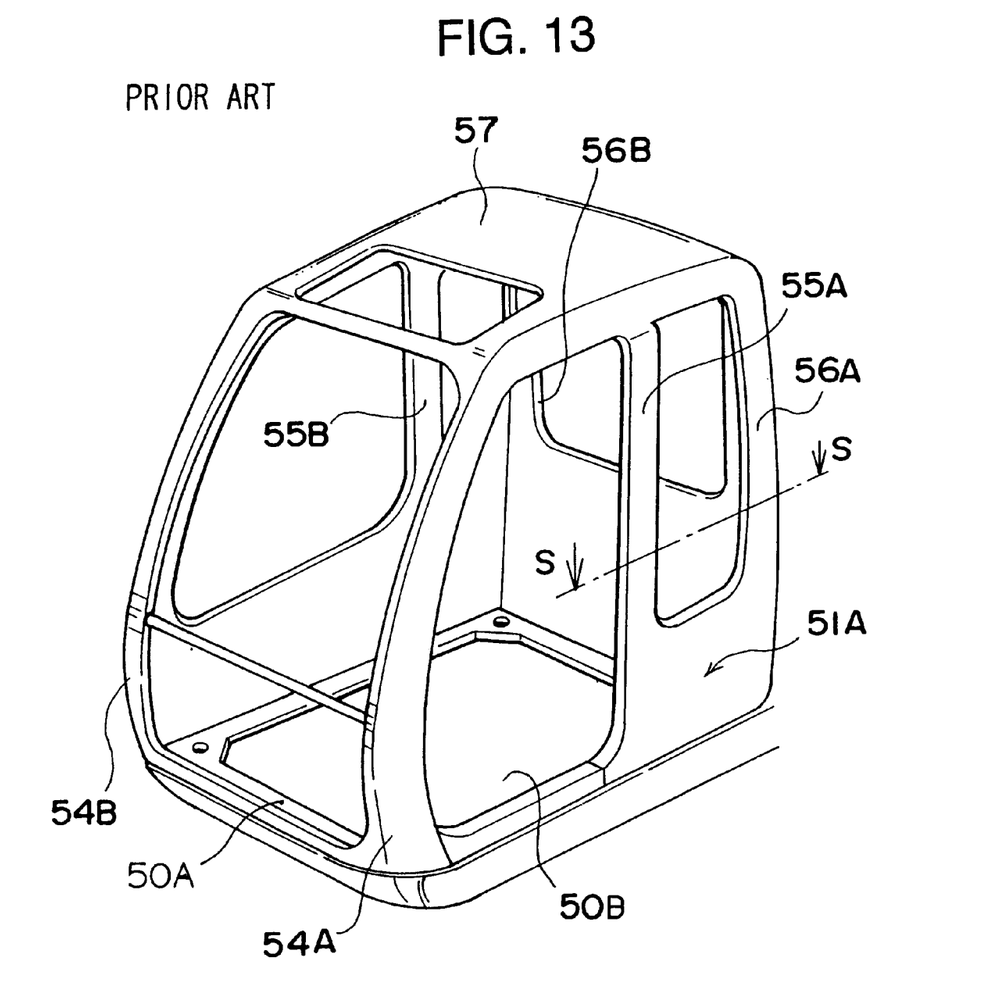
FIG. 13 shows a perspective view of the frame structure of an operator's cab in the prior art.
Figure 14:
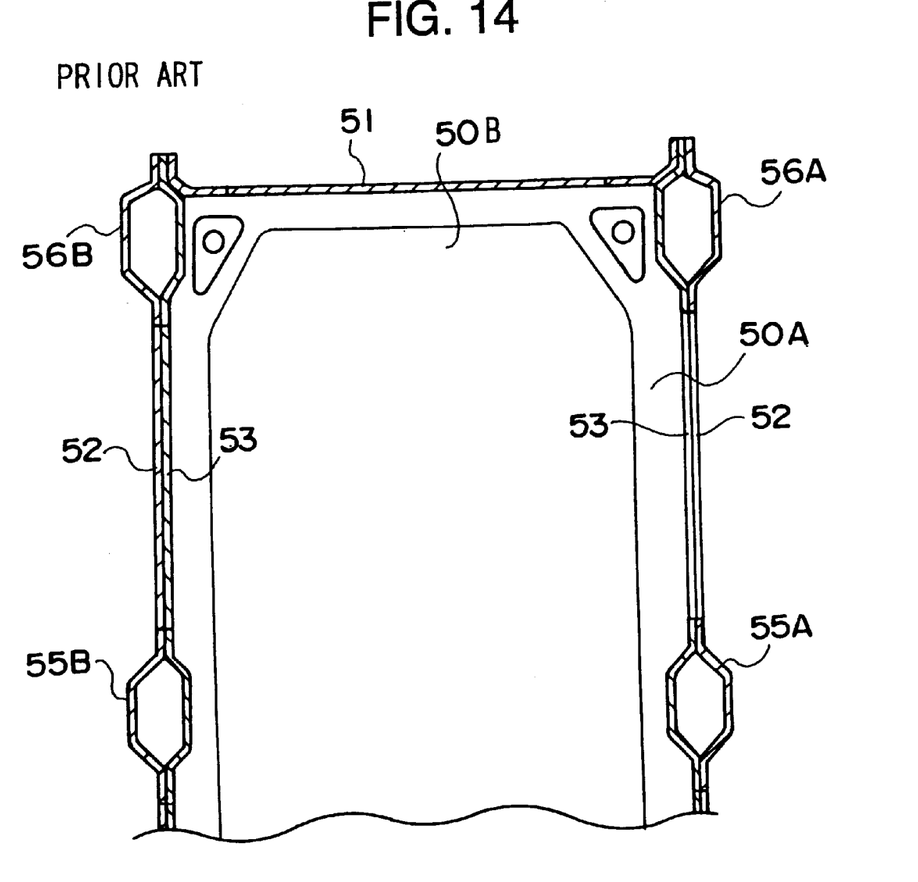
FIG. 14 shows a cross section of a rear portion of the operator's cab in the prior art in the horizontal direction.
Figure 15:
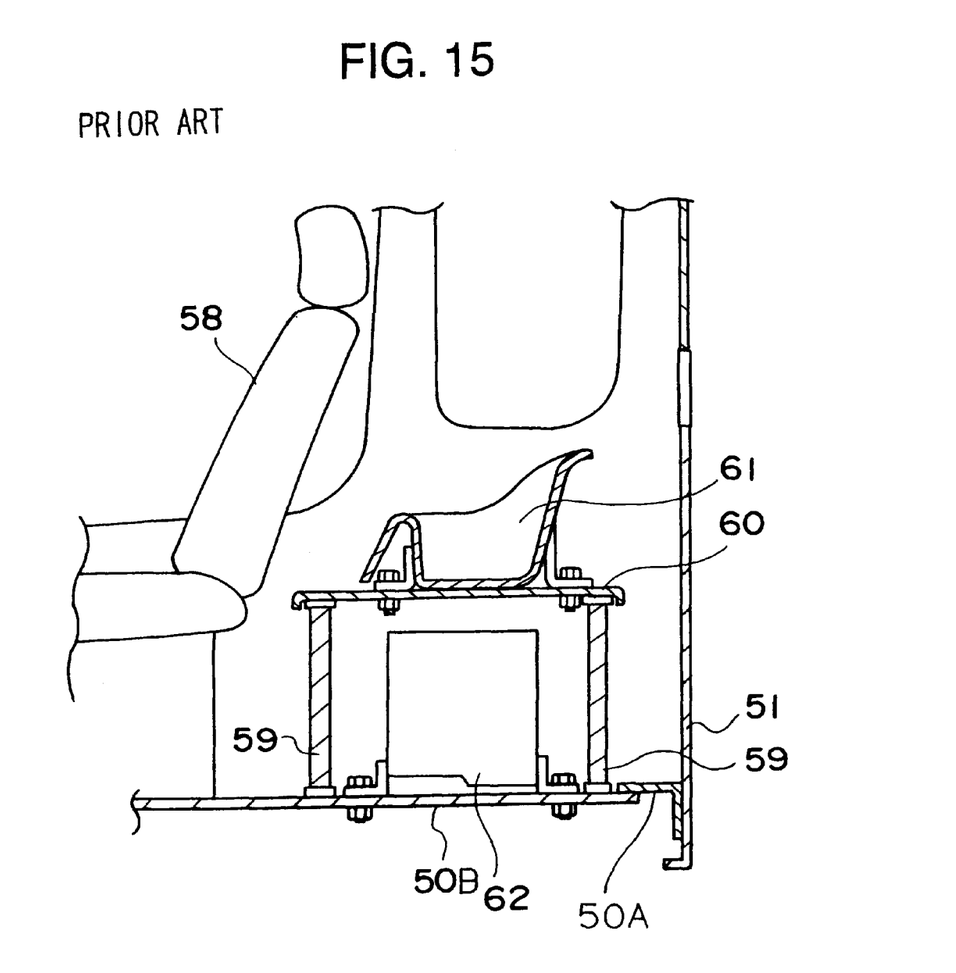
FIG. 15 shows the arrangement of the parts inside the operator's cab in the prior art.

FIG. 13 is a perspective view of an operator's cab frame constituting a structural support member of an operator's cab and FIG. 14 is a cross section along line S—S in FIG. 13. As illustrated in FIGS. 13 and 14, an operator's cab in the prior art is mainly constituted of a base plate 50A provided as the bottom surface, a rear panel 51 as the rear surface, which are provided standing on the base plate 50A, and side panels 51A, each constituted of an outer panel 52 and an inner panel 53 as the left side surface or the right side surface, which are provided standing on the base plate 50A, bonded with each other one on top of the other. To the left and right at the front end, the left and right at the center and the left and right at the rear end of the operator's seat, the outer panels 52 and inner panels 53 form hollow first pillars 54A and 54B, second pillars 55A and 55B and third pillars 56A and 56B respectively, extending in the vertical direction. A roof 57 is provided atop the pillars 54A and 54B through 56A and 56B. Various parts are provided as illustrated in FIG. 15 in the rear of the inside of the operator's cab having such a frame structure. In FIG. 15, supports 59 are provided standing on the upper surface of the baseplate 50B behind the operator's seat 58, with a plate 60 provided across between the upper ends of the supports 59. A storage tray 61 is mounted at the upper surface of the plate 60 and an air conditioning system 62 is mounted at the upper surface of the base plate 50B below the plate 60.

DISCLOSURE OF THE INVENTION

As is well known, hydraulic shovels are widely used in drilling operations and the like performed on work sites where the ground is often uneven or inclined. During operation on a work site where the footing is poor, the machine body is frequently used in an inclined state and, consequently, the machine body may tip over. In recent years, assurance of safety in construction machines such as hydraulic shovels has been pursued with particular vigor, and it has become necessary to ensure that even if the machine body tips over and a tipping load is placed on the operator's cab, the operator's cab frame does not become greatly deformed from the viewpoint of assuring protection of the worker inside the operator's cab. Thus, an improvement in the strength of the operator's cab against a tipping load is eagerly sought.

However, with the operator's cab in the prior art described above, which is not designed by taking into consideration the possibility of it coming under an excessive tipping load, a sufficient degree of strength cannot be assured for the operator's cab. An improvement in the strength of the operator's cab may be achieved by inserting reinforcement members inside the pillars constituting the operator's cab frame to improve the strength of the pillar portions as disclosed in Japanese Laid-Open Patent Publication No. 1997-25648, for instance. However, pillar portions structured in this manner require an increase in the number of parts and also lead to a more complicated manufacturing process, which, in turn, results in a great increase in the production cost.

An object of the present invention is to provide an operator's cab in a construction machine whose strength can be effectively improved in a simple structure.

In order to attain this object, an operator's cab in a construction machine according to the present invention, which has pillars standing at a left side surface and a right side surface, comprises a frame reinforcement member that extends between the pillars and meets at a near right angle to the pillars so as to create a resistance against a bending load applied to the pillars. By this means, a reinforced structure can be achieved with ease even in an existing operator's cab to achieve an improvement in the strength of the operator's cab against a tipping load.

Preferably, the above operator's cab in a construction machine further comprises: a rear panel standing at a rear side of an operator's seat; and a base plate located at a bottom portion of the operator's seat. And, at least either a front end portion of the frame reinforcement member and the base plate or a rear end portion of the frame reinforcement member and the rear panel are bonded with each other. By this means, the frame reinforcement member constitutes a closed-off space together with the side panels, the base plate and the rear panel, which, in turn, contributes to a further improvement in the strength of the operator's cab.

Also, preferably, the frame reinforcement member is constituted of a plate member. By this means, a higher degree of freedom is afforded in design compared to design that employs commercially available steel pipe or steel bar and an optimal shape for strength can be achieved.

Also, preferably, the frame reinforcement member is constituted of a resin material having a high degree of rigidity. By this means, the reinforcement member may be formed in a complicated shape, e.g., a reinforcement plate having a tray, to reduce the number of parts required.

Another operator's cab in a construction machine according to the present invention, which has at least side panels standing in a back and forth direction at left and right side surfaces of an operator's seat, comprises a frame reinforcement member that extends between the side panels and meets at a near right angle to the side panels so as to create a resistance against a bending load applied to the side panels. By this means, a reinforced structure can be achieved with ease even in an existing operator's cab to achieve an improvement in the strength of the operator's cab against a tipping load, as explained above.

Preferably, in the above operator's cab in a construction machine, the side panels are each constituted of a pair of a side outer panel and a side inner panel bonded parallel to each other to form a hollow portion in between; a strut-shaped hollow pillar is formed at, at least, one location of the hollow portion; and the frame reinforcement member extends between hollow pillars left and right of the operator's seat. By this means, the frame reinforcement member is supported at locations where the degree of rigidity is higher. Furthermore, preferably, a pillar reinforcement member is provided in the hollow pillar to increase a modulus of section of the hollow pillar. By this means, the rigidity of the hollow portions is further improved.

Also, preferably, a rear panel standing at a rear side of the operator's seat and a base plate located at a bottom portion of the operator's seat are provided, and at least either a front end portion of the frame reinforcement member and the base plate or a rear end portion of the frame reinforcement member and the rear panel are bonded with each other.

Also, preferably, the frame reinforcement member is constituted of plate member or a resin material having a high degree of rigidity.

Also, preferably, the side panels are each constituted of a pair of a side outer panel and a side inner panel bonded parallel to each other to form a hollow portion in between, and the operator's cab in a construction machine comprises a hollow portion reinforcement member that extends vertically in the hollow portion so as to increase a modulus of section of the hollow portion in a horizontal direction. By this means, the location of the hollow portion reinforcement is not limited to the location of a pillar portion, and accordingly a higher degree of freedom is afforded in design.

BEST MODE FOR CARRYING OUT THE INVENTION

The following is an explanation of the preferred embodiments of the present invention in reference to the drawings.

First Embodiment

Figure 1:
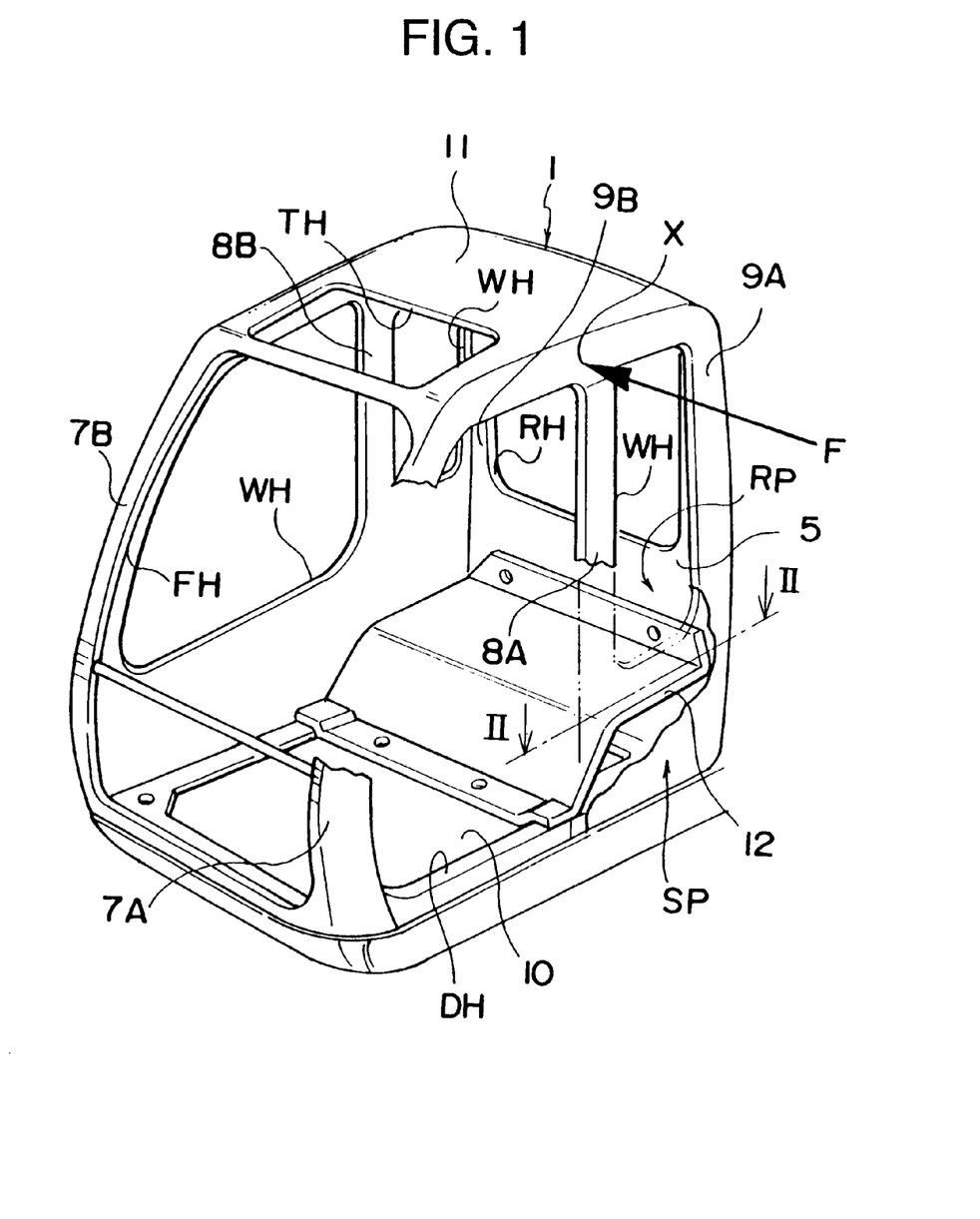
FIG. 1 shows a perspective view illustrating the frame structure of the operator's cab in an embodiment of the present invention.
Figure 2:
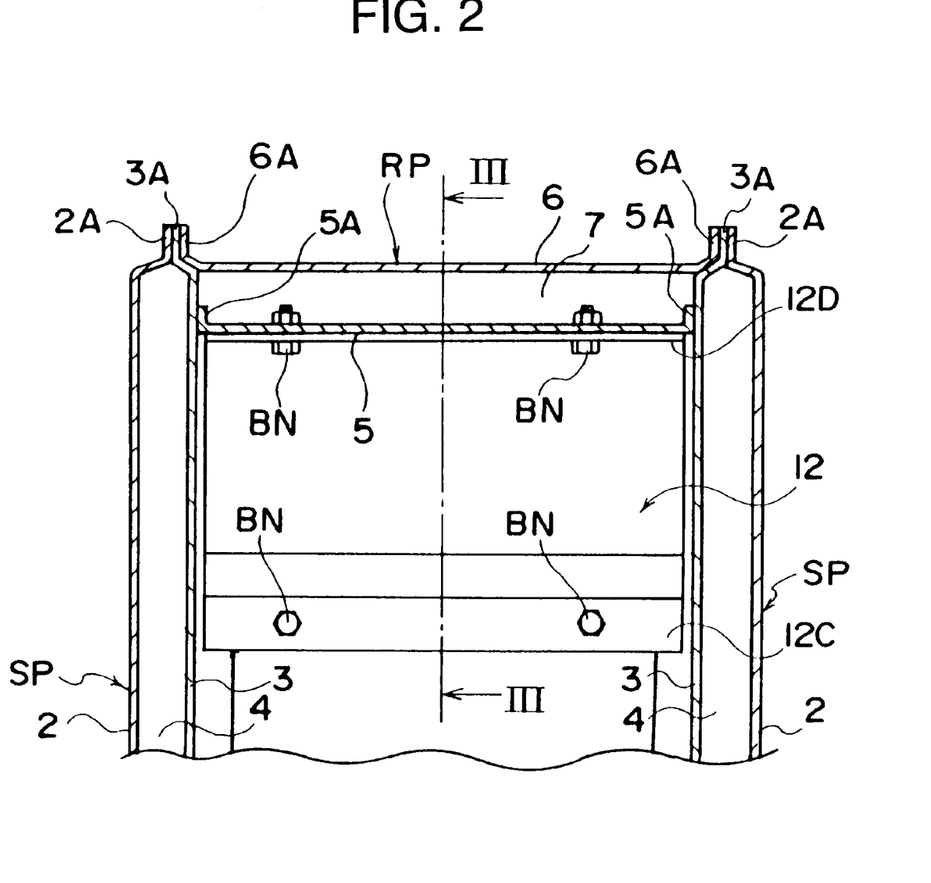
FIG. 2 shows a cross section of a rear portion in the first embodiment in the horizontal direction (a cross section along line II—II in FIG. 1).

FIG. 1 is a perspective view illustrating the frame structure of the operator's cab in the first embodiment of the present invention and FIG. 2 is a cross section along line II—II in FIG. 1. As illustrated in FIG. 2, at the left side surface and the right side surface of an operator's cab 1, a side outer panel 2 distended outward and a side inner panel 3 distended inward are provided parallel to each other with a hollow portion 4 formed inside. At the rear ends of the side outer panel 2 and the side inner panel 3, flange portions 2A and 3A are respectively provided, and the inner surface of the side outer panel 2 and the outer surface of the side inner panel 3 are bonded with each other. At the rear surface of the operator's cab 1, a rear inner panel 5 and a rear outer panel 6 are provided over a distance from each other with a hollow portion 7 formed inbetween. Flange portions 5A and 6A are provided respectively at the ends of the inner panel 5 and the rear outer panel 6 on both the left and right sides, to be bonded to the inner surfaces of the side inner panels 3 and the inner surfaces of the flanges 3A respectively. It is to be noted that the side outer panel 2 and the side inner panel 3 constitute the side panels SP and that the rear inner panel 5 and the rear outer panel 6 constitute a rear panel RP.

As illustrated in FIG. 1, the hollow portions 4 formed at the left and right side surfaces form strut-like spaces that are vertically elongated at the front, center and rear of the operator's cab 1 to constitute first, or front, pillars 7A and 7B, second, or center, pillars 8A and 8B and third, or rear, pillars 9A and 9B, the front, center and rear pillars 7A, 7B, 8A, 8B, 9A and 9B defined by the forward movement of the operator's cab 1. At the bottom of the operator's cab 1, a base plate 10 having a flange at each of the edges at the front, rear and left and right, to be detailed later, is provided and a roof 11 is provided at the upper ends of the pillars 7A and 7B through 9A and 9B. A reinforcement plate 12, which is to be detailed later, is provided inside the operator's cab 1. An opening FH for mounting a front glass and an opening RH for mounting a rear glass are respectively provided at the front surface and the rear surface of the operator's cab 1, with an opening WH for mounting a window provided at the left and right side surfaces. At the left side surface of the operator's cab 1, an opening DH for mounting a door is provided, and an opening TH for mounting a skylight is provided toward the front of the roof 11.

Figure 3:
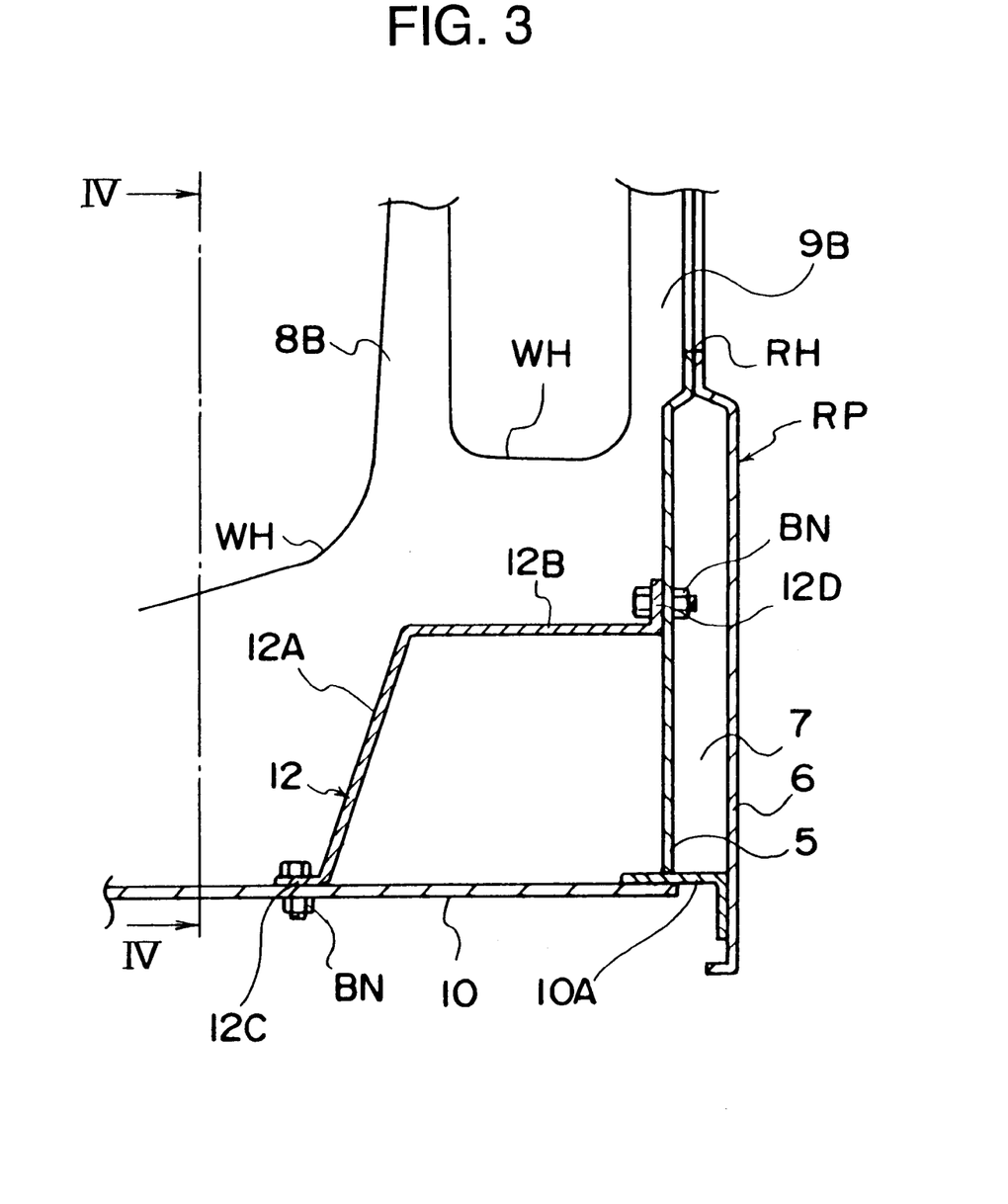
FIG. 3 shows a longitudinal cross section of the rear portion in the first embodiment (a cross section along line III—III in FIG. 2).

As illustrated in FIG. 3, which is a cross section along line III—III in FIG. 2, the reinforcement plate 12 provided inside the operator's cab 1 is constituted of an inclined portion 12A located further toward the front relative to the second pillar 8B and a horizontal portion 12B extending from the second pillar 8B to the third pillar 9B, and is formed in a bent shape with its cross section achieving a rough "" < "" shape (Japanese letter "» < »" shape). Flanges 12C and 12D are provided respectively at the front and the rear ends of the reinforcement plate 12 and, as illustrated in FIGS. 2 and 3, the flanges 12C and 12D of the reinforcement plate 12 are secured to the upper surface of the base plate 10 and a side surface of the rear inner panel 5 respectively, by tightening bolt nuts BN, at two locations. As illustrated in FIG. 3, the lower end of the rear inner panel 5 is bonded to the upper surface of the rear flange 10A having an L-shaped cross section of the base plate 10, and the front surface of the rear outer panel 6 is bonded to a side surface of the flange 10A.

Figure 4:
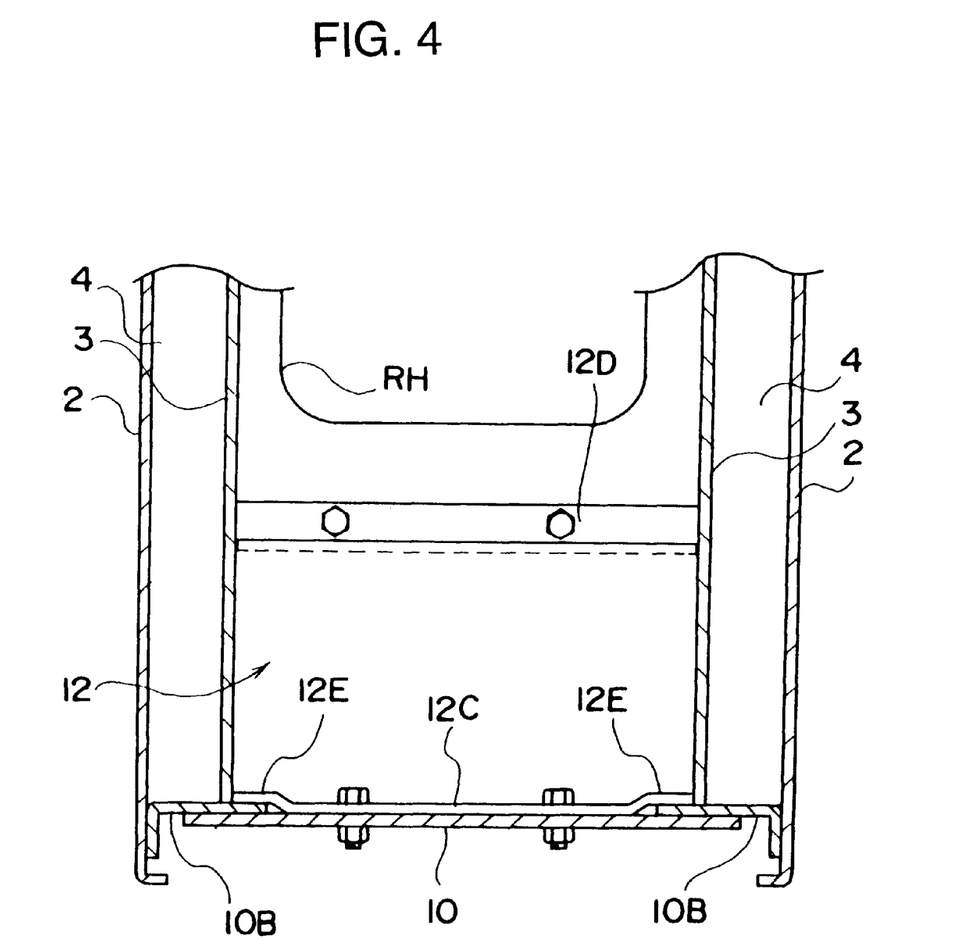
FIG. 4 shows a longitudinal cross section of the second pillar portions in the first embodiment in the left and right direction (a cross section along line IV—IV in FIG. 3).

As illustrated in FIG. 4, which is a cross section along line IV-IV in FIG. 3, left and right ends 12E of the front flange 12C of the reinforcement plate 12 are made to distend upward and these distended portions 12E are placed in tight contact with the upper surfaces of the left and right flanges 10B having an L-shaped cross section, of the base plate 10. The left and right ends of the reinforcement plate 12 are placed in close proximity to or contact with the inner surface of the side inner panel 3. Also, these may be bonded to each other. The lower ends of the side innerpanels 3 are bonded to the upper surfaces of the flanges 10B of the base plate 10, with the inner surfaces of the side outer panels 2 bonded to side surfaces of the flanges 10B. In the first embodiment, the main structural support member of the operator's cab 1 comprises individual panels 2 and 3 (side panels SP) and 5 and 6 (rear panel RP) provided at the left and right side surfaces and the rear surface and the reinforcement plate 12 provided inside the operator's cab 1.

Figure 5:
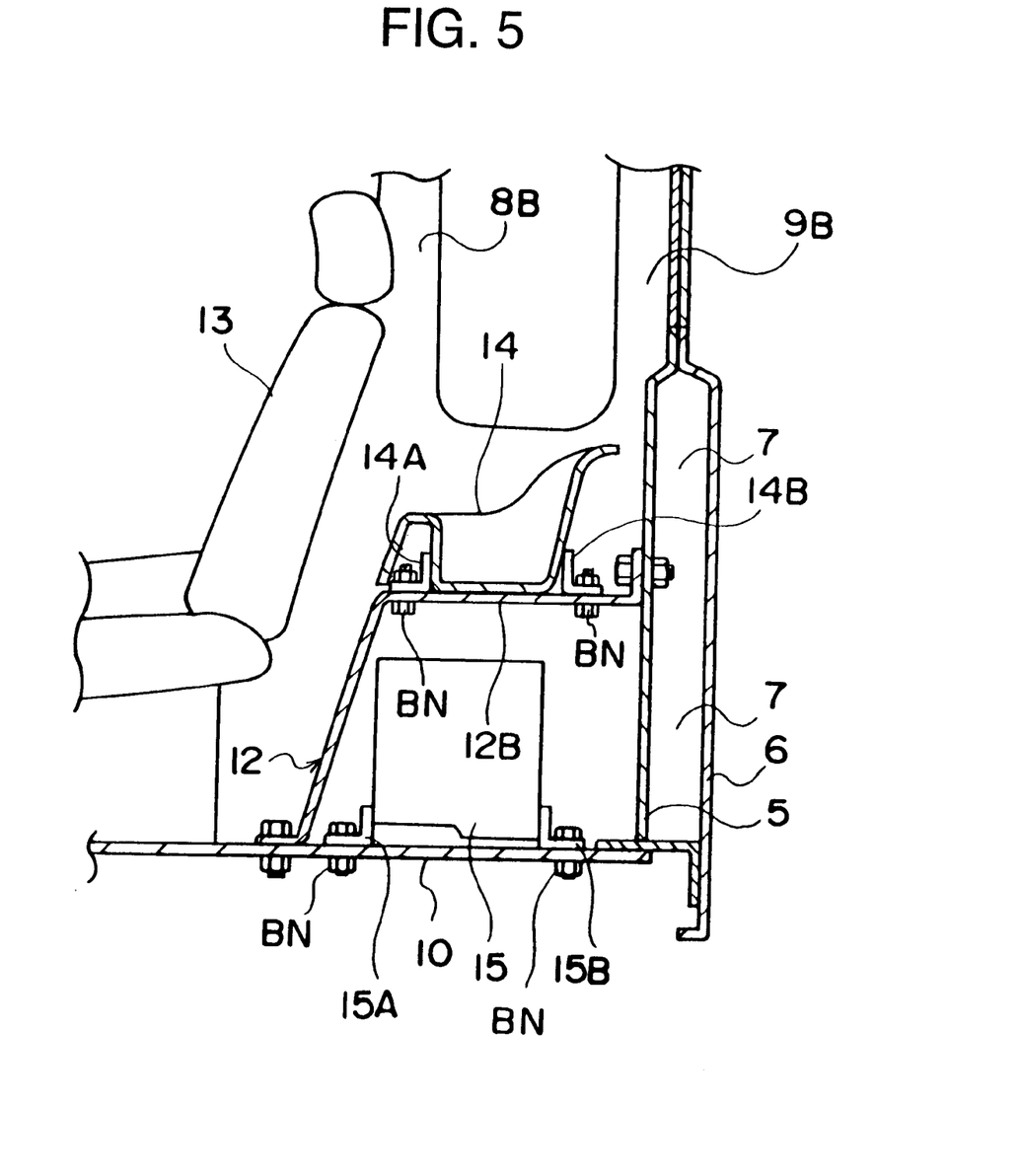
FIG. 5 shows the arrangement of parts inside the operator's cab in the first embodiment.

It is to be noted that in the spaces above and under the reinforcement plate 12, a tray 14 and an air conditioning system 15 may be provided, as illustrated in FIG. 5. In FIG. 5, the storage tray 14 is provided at the upper surface of the horizontal portion 12B of the reinforcement plate 12 with flanges 14A and 14B provided to the front and rear of the tray 14 secured onto the horizontal portion 12B of the reinforcement plate 12 by tightening bolt nuts BN. The air conditioning system 15 is provided under the reinforcement plate 12, with flanges 15A and 15B provided to the front and rear of the air conditioning system 15 secured to the base plate 10 by tightening bolt nuts BN.

Figure 6A:
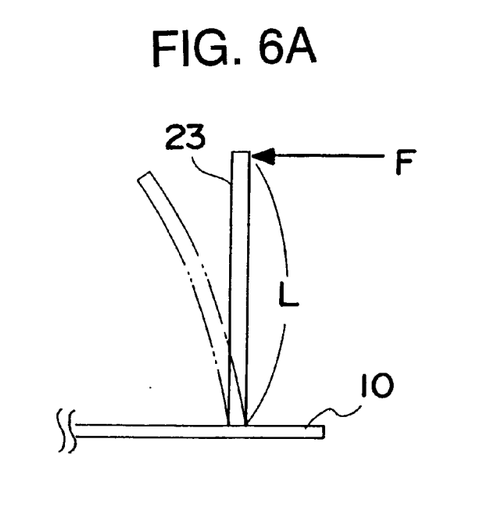
FIGS. 6A and 6B show a schematic comparison of a deformation of the operator's cab in the embodiment of the present invention and the deformation of a structure in the prior art.
Figure 6B:
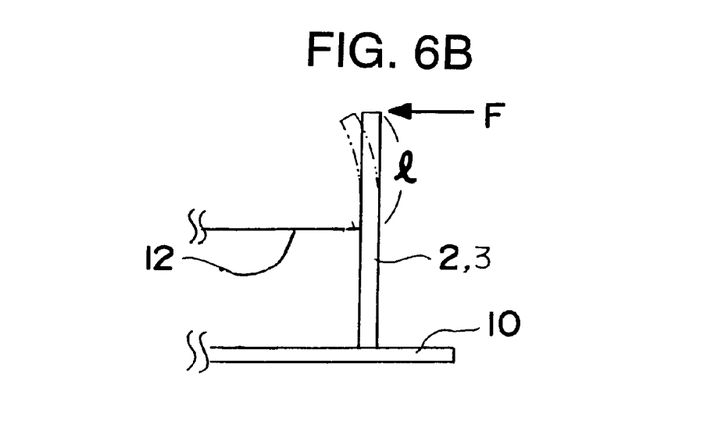
Figure 7:
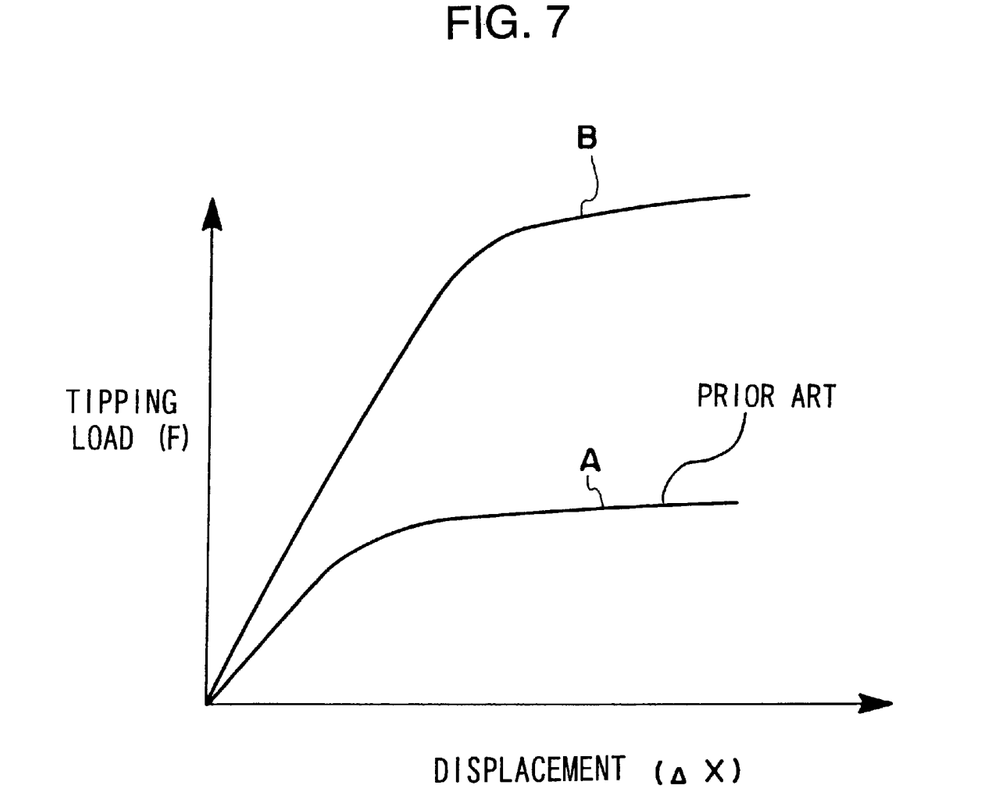
FIG. 7 shows a comparison between the strength characteristics of the operator's cab in the embodiment of the present invention and the strength characteristics achieved in the structure in the prior art.

Next, the strength characteristics of the operator's cab 1 in the first embodiment are explained in comparison to the strength characteristics achieved in a structure in the prior art. FIGS. 6A and 6B schematically illustrate a state of deformation occurring when a tipping load F is placed on a side outer panel 2 and inner panel 3 (hereafter referred to as the side surface frame) on the base plate 10. In FIG. 6A which illustrates the structure in the prior art, the side frame comes under an F×L bending moment load and, as a result, the side frame becomes greatly deformed as indicated with the dotted lines. In contrast, in FIG. 6B, which illustrates the structure in the first embodiment, any deformation which otherwise might occur at the lower portion of the side frame is prevented by the reinforcement plate 12 and, consequently, the bending moment that is applied is only F×1, thereby reducing the extent of deformation of the side frame as indicated with the dotted lines. Now, this aspect is explained in reference to FIG. 7, which illustrates the relationship between the tipping load F applied to the X portion in FIG. 1 and the displacement □x of the X portion. In FIG. 7, the strength characteristics achieved through the structure in the prior art are represented by the curve A, whereas the strength characteristics achieved in the embodiment are represented by the curve B. As the figure clearly illustrates, the strength of the operator's cab in the embodiment achieves a great improvement compared to that achieved through the structure in the prior art.

In addition, since the structure provided with the reinforcement plate 12 at the inner walls of the operator's cab 1 can be directly adopted in an operator's cab in the prior art, as illustrated in FIGS. 13 through 15, without requiring any changes so that the strength of the operator's cab in the prior art can be easily improved without having to greatly modify the manufacturing process or having to implement large-scale installation of new equipment. Furthermore, since the reinforcement plate 12 also functions as a mounting platform for the tray 14, parts such as supports, plates and the like for mounting the tray 14 are not required to achieve a reduction in the number of required parts and an improvement in assembly efficiency.

Second Embodiment

Figure 8:
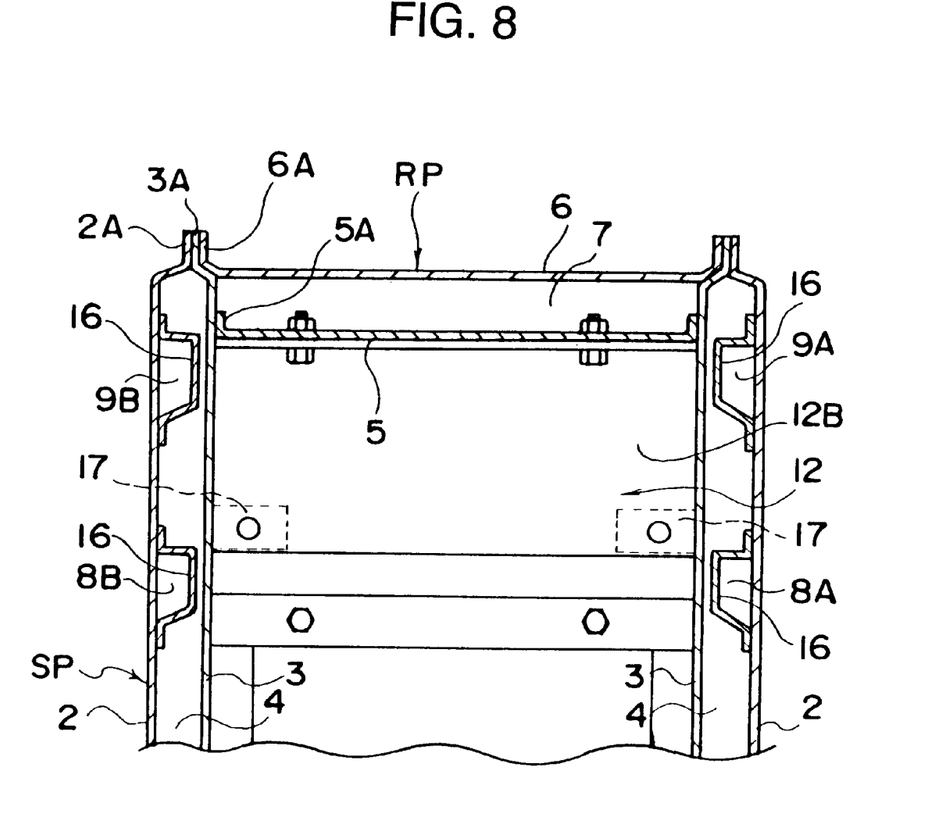
FIG. 8 shows a cross section of a rear portion in the second embodiment in the horizontal direction.
Figure 9:
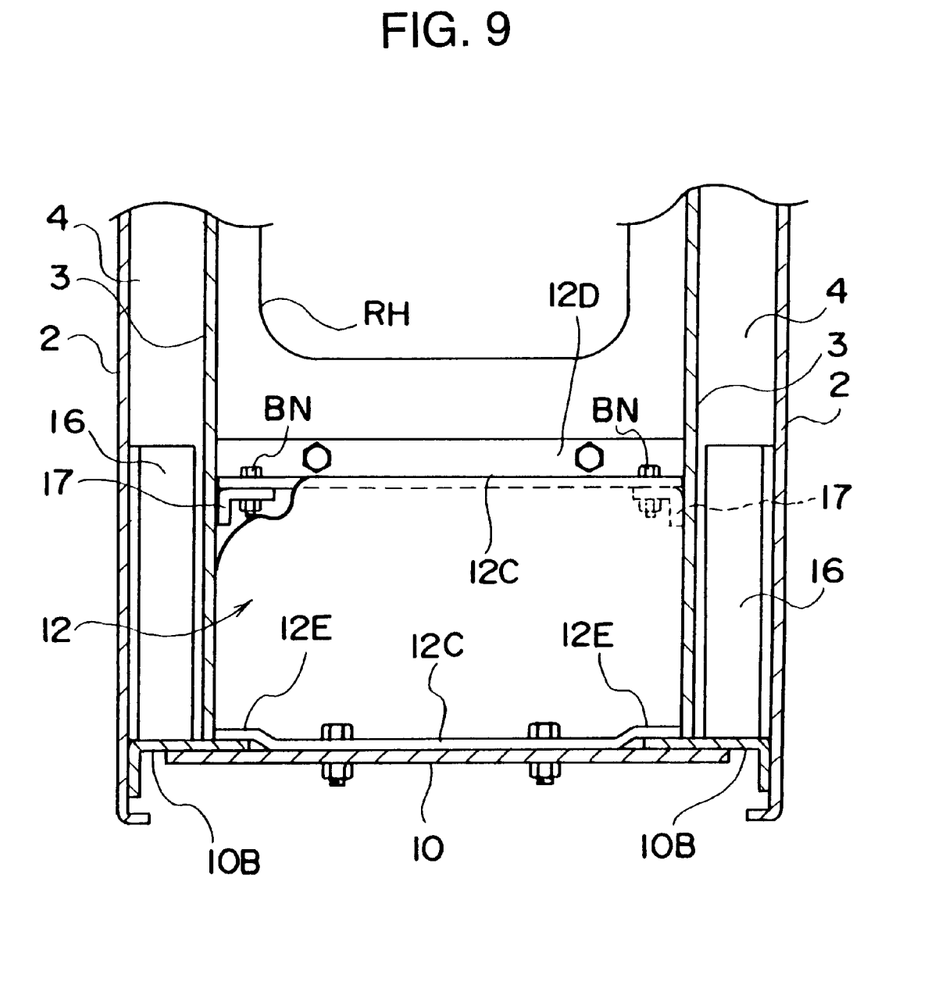
FIG. 9 shows a longitudinal cross section of the second pillar portions in the second embodiment in the left and right direction.

Next, the second embodiment of the present invention is explained. FIG. 8 is a cross section of a rear portion of the second embodiment in the horizontal direction and FIG. 9 is a cross section of the second pillar portion in the vertical direction, respectively corresponding to FIGS. 2 and 4 illustrating the first embodiment. In FIGS. 8 and 9, the same reference numbers are assigned to portions identical to those in FIGS. 2 and 4, and the explanation here will be mainly focused on the differences. As illustrated in FIG. 8, a pillar reinforcement plate 16 having a roughly Japanese letter "" ⊐ "" shaped cross section is provided inside each of the second pillars 8A and 8B and in the third pillars 9A and 9B, with the pillar reinforcement plate 16 bonded to the inner surface of the side outer panel 2 at two locations distanced from each other. As illustrated in FIG. 9, the lower ends of the pillar reinforcement plate 16 are bonded to the upper surfaces of the flanges 10B on the base plate 10, with their upper ends reaching the height of the horizontal portion 12B of the reinforcement plate 12 provided inside the operator's cab 1. The stays 17 are bonded to the inner surfaces of the side inner panels 3 at the left and right in the vicinity of the second pillars 8A and 8B, and the reinforcement plate 12 which is secured by the front and rear flanges 12C and 12D is also secured to the upper surfaces of the stays 17 by tightening the bolt nuts BN provided at locations to the left and right.

Since the pillar reinforcement plate 16 are provided inside the pillars 8A, 8B, 9A and 9B in the second embodiment, the rigidity of the pillars 8A, 8B, 9A and 9B increases to further improve the strength of the operator's cab 1 against a tipping load. In addition, the left end and the right end of the reinforcement plate provided inside the operator's cab 1 are secured onto the side inner panels 3 to achieve an integrated structure. Thus, the strength of the operator's cab 1 is improved against a load placed in the back and forth direction, for instance, as well as against a tipping load placed perpendicularly to the side surfaces.

Figure 10:
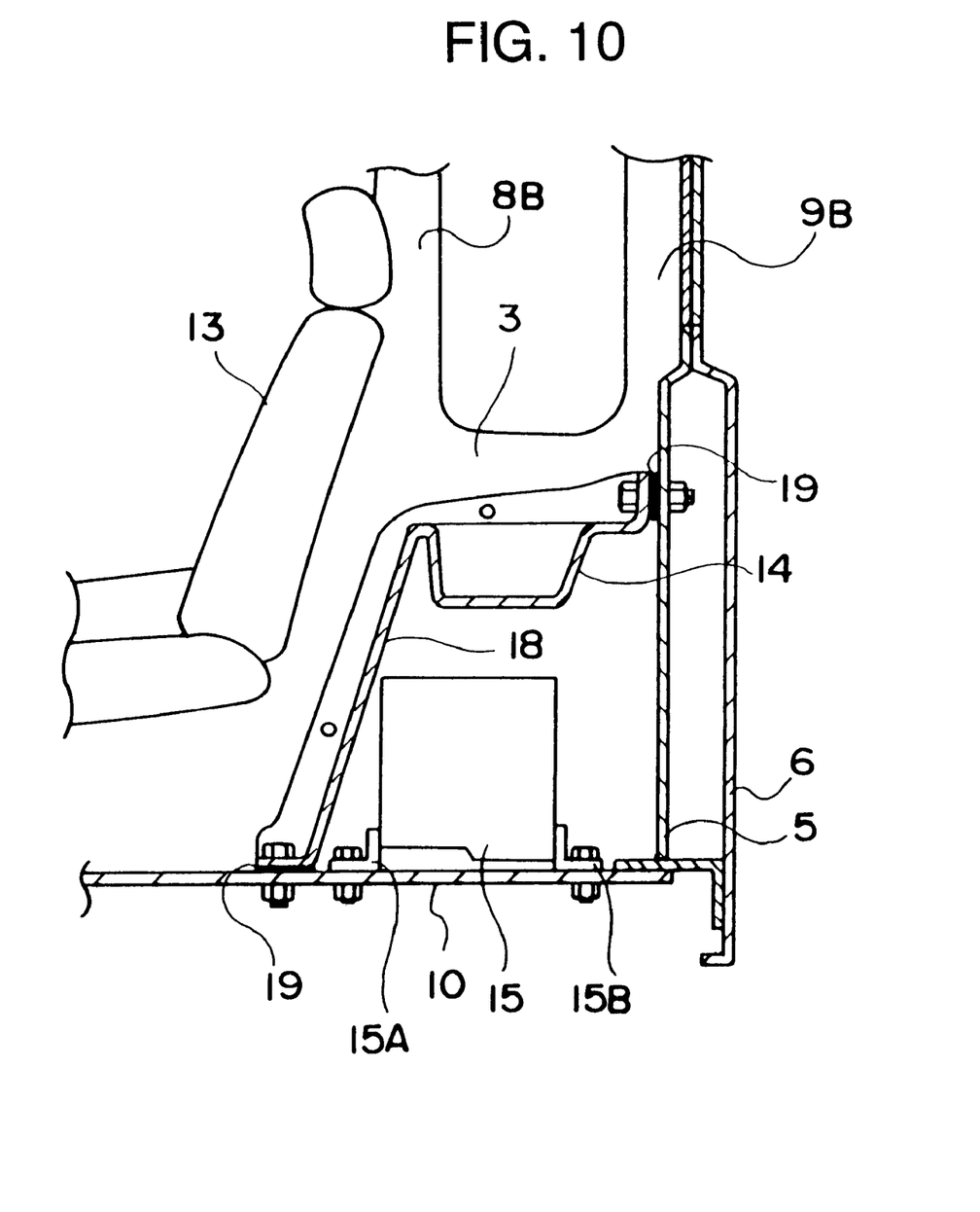
FIG. 10 shows an example of a variation of the embodiment of the present invention in which a reinforcement plate constituted of a resin material having a high degree of rigidity and forming an integrated structure is provided inside the operator's cab.
Figure 11:
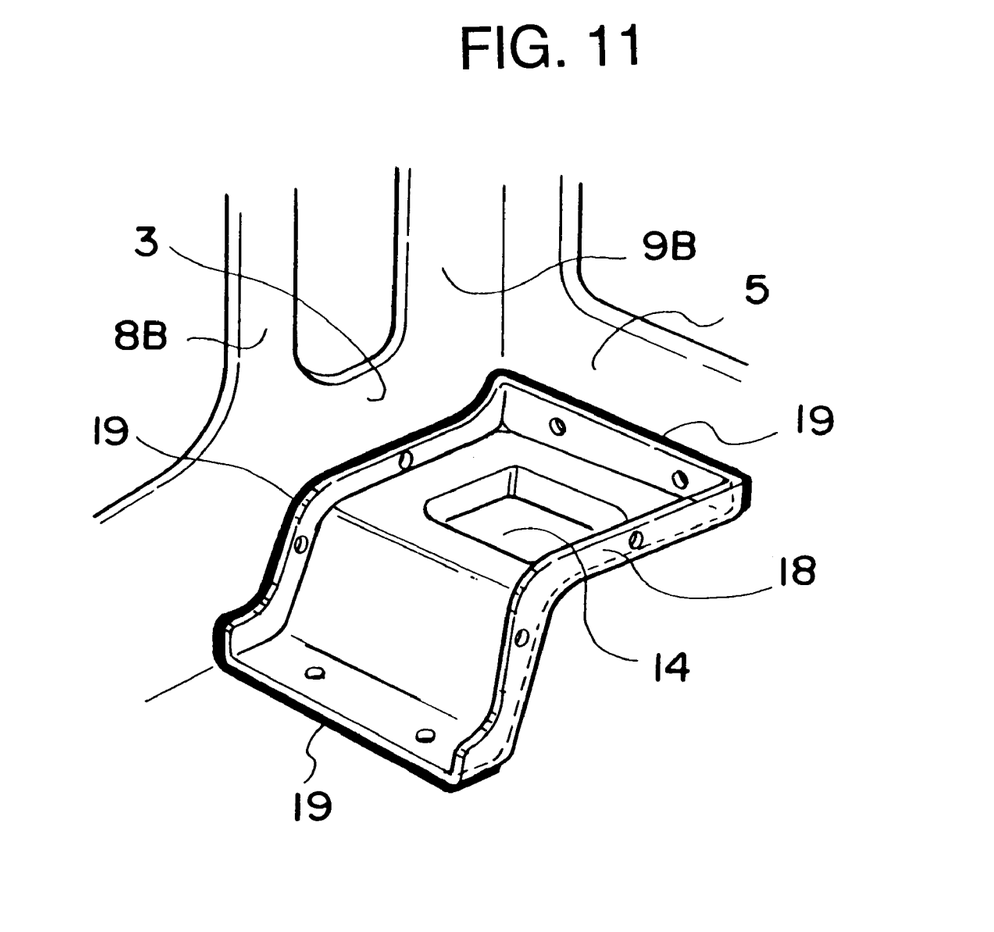
FIG. 11 shows a perspective view of the reinforcement plate in FIG. 10 mounted inside the operator's cab.

It is to be noted that, as illustrated in a side cross section of the rear side of the inside of the operator's cab 1 in FIG. 10 and its partial perspective view in FIG. 11, the tray portion 14 may be provided as an integrated part of a reinforcement member 18 by forming the reinforcement member 18 using a resin material or the like having a high degree of rigidity. This will further reduce the number of parts and further improve the ease of assembly. In addition, it will achieve the reduction in weight compared to a structure employing a steel plate. Furthermore, as illustrated in FIGS. 10 and 11, the bonding surfaces between the reinforcement member 18 and the inner plates 3, between the reinforcement member 18 and the base plate and between the reinforcement member 18 and the rear inner panel 5 may be filled with sealing members 19 such as gaskets. This will create a sealed space under the reinforcement member 18 to protect the air conditioning system 15 so that the interior the operator's cab 1 can be easily washed with water.

Figure 12:
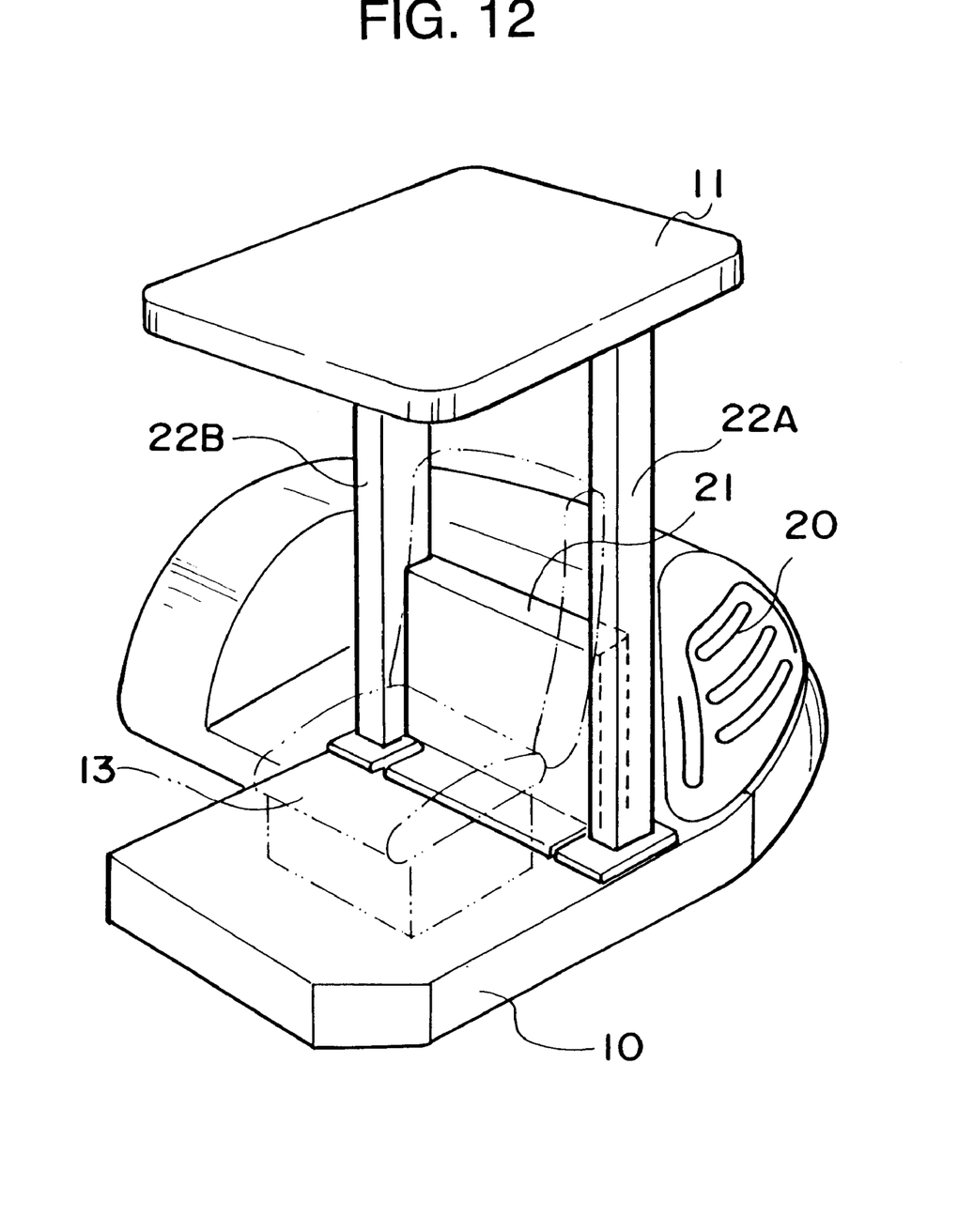
FIG. 12 shows the reinforcement plate in the embodiment of the present invention employed in a mini-shovel.

In addition, while the explanation has been given on a reinforcement structure for a medium size hydraulic shovel in which the tray 14 is provided behind the operator's seat 13 in reference to the embodiments described above, a similar reinforcement structure maybe adopted in a so-called mini-shovel in which an engine room 20 is provided immediately behind the operator's seat 13, as illustrated in FIG. 12. In this case, by providing pillars 22A and 22B with the length of a reinforcement member 21 reduced in front and rear direction, the strength of the operator's cab against a tipping load is improved.

Furthermore, the shape of the reinforcement member 12 is not restricted to that employed in the embodiment described above, and it may assume any other shape as long as it reduces the bending moment generated in the event of a tipping incident. The reinforcement plate 12 may have a pressed structure or a welded structure. Also, the reinforcement member may be a pipe or a bar-shaped one, or made of pipes or bar-shaped ones. Namely, all structures that can be provided over between side panels SP or between pillars 7A and 7B or 8A and 8B or 9A and 9B can be available. Moreover, while the bolt nuts BN are employed to secure the reinforcement plate 12, another method for securing it may be employed. For example, welding, brazing, adhesive, bolts, rivets or bonded through any other method may be available. In bonding of the inner panel 3, the outer panel 2, or other members, welding, brazing, adhesive, bolts, rivets or bonded through any other method may be also available.

In addition, while the pillar reinforcement members 16 are provided inside the second pillars 8A and 8B and the third pillars 9A and 9B, they may be provided inside the first pillars 7A and 7B. Furthermore, the pillar reinforcement plate 16 may assume any of various shapes as long as it increases the modulus of section of the pillars 7A and 7B through 9A and 9B. For example, a pipe, a round-shaped bar, a square-shaped bar or the like may be available. Their lengths may be greater or smaller than those shown in the figures.

Although it may be better that each of the pillar reinforcement members 16 is provided on the line where each of pillars 7A, 7B through 9A, 9B extends vertically, it may be also acceptable that each of the pillar reinforcement members 16 is not provided on the line. If the vertical length of the pillar reinforcement members 16 is within hollow portions 4 except pillar portions 7A, 7B through 9A, 9B, the pillar reinforcement members can be provided vertically in any places of hollow portions 4. In other words, the pillar reinforcement members can be provided to stand in the same direction as the pillars extend, wherever in hollow portions 4. The strength of the operator's cab against tipping over load can be improved in this case, too.

What is claimed is:

1. An operator's cab in a construction machine comprising:

a base plate that defines a bottom portion of the operator's cab;

a first pair of pillars standing at a left side surface and a right side surface of the operator's cab at a rear side of the operator's cab;

a second pair of pillars standing at the left surface and the right side surface at an intermediate position between the rear side and a front side of the operator's cab; and a frame reinforcement member that is provided in space above the base plate, is a member independent from the base plate, extends between the first pair of pillars and extends between the second pair of pillars, so as to create a resistance against a bending load applied to the pillars.

2. An operator's cab in a construction machine according to claim 1, further comprising:

a rear panel standing at a rear side of an operator's seat, wherein at least either a front end portion of said frame reinforcement member and said base plate or a rear end portion of said frame reinforcement member and said rear panel are bonded with each other.

3. An operator's cab in a construction machine according to claim 1, wherein said frame reinforcement member is constituted of a plate member.

4. An operator's cab in a construction machine according to claim 1, wherein said frame reinforcement member is constituted of a resin material having a high degree of rigidity.

5. An operator's cab in a construction machine comprising:

a base plate that defines a bottom portion of the operator's cab;

side panels standing in a back and forth direction at left and right side surfaces of an operator's seat; and a frame reinforcement member that is provided in space above the base plate, is a member independent from the base plate, extends between the side panels and meets at a near right angle to the side panels so as to create a resistance against a bending load applied to the side panels.

6. An operator's cab in a construction machine according to claim 5, wherein:

said side panels are each constituted of a pair of a side outer panel and a side inner panel bonded parallel to each other to form a hollow portion in between;

a strut-shaped hollow pillar is formed at, at least, one location of said hollow portion; and said frame reinforcement member extends between hollow pillars left and right of said operator's seat.

7. An operator's cab in a construction machine according to claim 6, further comprising a pillar reinforcement member that is provided in said hollow pillar to increase a modulus of section of said hollow pillar.

8. An operator's cab in a construction machine according to claim 5, further comprising:

a rear panel standing at a rear side of said operator's seat, wherein at least either a front end portion of said frame reinforcement member and said base plate or a rear end portion of said frame reinforcement member and said rear panel are bonded with each other.

9. An operator's cab in a construction machine according to claim 5, wherein said frame reinforcement member is constituted of plate member.

10. An operator's cab in a construction machine according to claim 5, wherein said frame reinforcement member is constituted of a resin material having a high degree of rigidity.

11. An operator's cab in a construction machine according to claim 5, wherein said side panels are each constituted of a pair of a side outer panel and a side inner panel bonded parallel to each other to form a hollow portion in between, further comprising:

a hollow portion reinforcement member that extends vertically in said hollow portion so as to increase a modulus of section of said hollow portion in a horizontal direction.

* * * * *